United States Patent [19]

Williams et al.

[11] 4,276,551

[45] Jun. 30, 1981

[54] ELECTRONICALLY SCANNED ANTENNA

[75] Inventors: Frederick C. Williams, Topanga; Wolfgang H. Kummer, Santa Monica, both of Calif.

[73] Assignee: Hughes Aircraft Company, Culver City, Calif.

[21] Appl. No.: 44,618

[22] Filed: Jun. 1, 1979

[51] Int. Cl.³ .......... H04B 7/00
[52] U.S. Cl. .......... 343/100 SA; 343/854
[58] Field of Search .......... 343/100 SA, 854

[56] References Cited

U.S. PATENT DOCUMENTS

| | | | |
|---|---|---|---|
| 2,676,257 | 4/1954 | Hebenstreit | 343/771 |
| 3,419,870 | 12/1968 | Wong | 343/768 |
| 3,434,139 | 3/1969 | Algeo | 343/778 |
| 3,438,035 | 4/1969 | Fling et al. | |
| 3,825,928 | 7/1974 | Williams | 343/5 R |
| 3,842,417 | 10/1974 | Williams | 343/5 R |
| 4,001,837 | 1/1977 | Regenos et al. | 343/815 |
| 4,045,800 | 8/1977 | Tang et al. | 343/854 |
| 4,119,971 | 10/1978 | Stark | 343/854 |

OTHER PUBLICATIONS

A. C. Schell, *Electronic Scanning*, Electrotechnology, Nov., 1968, pp. 29-41.

*Primary Examiner*—Theodore M. Blum
*Attorney, Agent, or Firm*—Kenneth W. Float; William H. MacAllister

[57] ABSTRACT

The herein disclosed electronically scanned antennas comprise a plurality of frequency scanned antenna sections each of which have a plurality of radiating elements and a plurality of phase shifters individually coupled to the antenna sections. Spatial steering of the beam over a predetermined angular subtense is provided in response to a change in frequency of the applied electromagnetic energy. The phase shifters are programmed to adjust the relative phase of the energy processed by each of the antenna sections so as to provide an energy beam having a coherent phase front. A first embodiment incorporates a plurality of serpentine feedlines disposed in a linear arrangement along with a plurality of phase shifters coupled thereto, which cause the plurality of feedlines to have the electrical characteristics of a single continuous feedline. A second embodiment incorporates the plurality of phase shifters as adapted to a thinned array antenna configuration.

6 Claims, 3 Drawing Figures

ELECTRONICALLY SCANNED ANTENNA

BACKGROUND OF THE INVENTION

The present invention relates to electronically scanned antennas, and more particularly to such antennas in which beam scanning in one dimension is accomplished by means of simultaneous frequency and phase control.

Both frequency and phase scanned antennas are well known in the art. Frequency scanned antennas have the advantages of simplicity and low cost; however, they do have certain drawbacks, including relatively large power losses in the feedlines, especially at higher radio frequencies, and narrow instantaneous bandwidth. Phase scanned antennas, on the other hand, provide for wide bandwidth, low power losses, and have the capability of radiating at multiple frequencies in a given beam direction. However, the conventional phase scanned antenna is quite expensive due to its high complexity and need for many expensive phase shifters.

Heretofore, conventional frequency scanned antennas have employed single continuous folded feedlines, such as those described in U.S. Pat. No. 3,434,139 for "Frequency Controlled Scanning Monopulse Antenna" by J. A. Algeo and U.S. Pat. No. 3,419,870 for "Dual Plane Frequency Scanned Antenna Array" by S. H. Wong. The continuous folded feedline, commonly referred to as a serpentine feed, is well known in the art, and is coupled to a plurality of radiating elements. The spacing between adjacent radiating elements and the length of the feedline between adjacent elements determine the spatial beam steering capability of the antenna in response to the frequency scan. In general, the element spacing should be sufficiently small to avoid grating lobes. For a better understanding of grating lobes and their effect upon antenna performance, see U.S. Pat. No. 3,825,928 for "High Resolution Bistatic Radar System" or U.S. Pat. No. 3,842,417 for "Bistatic Radar System," both by F. C. Williams.

For example, if the element spacing is chosen to be 0.65λ, a phase change of approximately ±120° between adjacent elements is required to produce ±30° of spatial beam motion. This result is determined from the equation $$\Phi=(2\pi d/\lambda)\sin\theta$$

where Φ is the phase between adjacent elements, d is the element spacing, λ is the wavelength of the energy and θ is the scan angle as measured from broadside.

The length s of the feedline between adjacent elements may be determined from the equation $$\phi=2\pi s/\lambda_g$$

where φ is the phase between adjacent elements and $\lambda_g$ is the wavelength of the energy in the feedline. To simplify calculating s, the dispersion in the feedline is assumed constant over the frequency bandwidth. If the center frequency is $f_1$, and the end of the band is at frequency $f_2$, the total frequency excursion is $\pm|f_2-f_1|$. Let k be the ratio between feedline and free-space wavelengths. Then $$\lambda_{g1}=k\lambda_1=(kc/f_1)$$

$$\lambda_{g2}=k\lambda_2=(kc/f_2)$$

and $$\Phi_2-\Phi_1=\frac{2\pi s(f_2-f_1)}{kc}$$

where c is the speed of light, and $\lambda_1$ and $\lambda_2$ are the free space wavelengths corresponding to $f_1$ and $f_2$ respectively.

In a practical application utilizing an X-band radar operating at 10 GHz, let $f_2-f_1=500$ MHz; the speed of light is $c=3\times10^8$ m/sec; and let $k=1.4$. Accordingly, $s=0.27$ meters for $\Phi_2-\Phi_1=120°$. A typical X-band antenna might be as much as 10 meters long. Using the 0.65λ element spacing, there are approximately 512 radiating elements, and the total length of the feedline is about 140 meters.

The 140 meter feedline length corresponds to a theoretical bandwidth of 700 KHz and a practical bandwidth of about 70 KHz. Such a bandwidth results in a range resolution of about 1400 meters, which greatly reduces the applications for which the radar is useful.

The 140 meter length of feedline also results in a theoretical power degradation at 10 GHz of 14 dB over the length of the feedline. It has been found in actual practice, however, that this power loss is on the order of 30 dB. Typical power losses at 20 GHz would be on the order of 50 dB. Additionally, as present radars now operate at millimeter wavelengths, above 35 GHz or so, feedline losses are markedly higher than in the example hereinabove and may be on the order of 90 to 100 dB.

An additional problem associated with a conventional frequency scanned antenna is its susceptibility to second-go-round returns. Second-go-round returns occur in a radar system, for example, when the system transmits a first pulse of energy at one frequency at time $t_1$, and a second pulse of the same frequency at a time $t_2$, and then a return pulse is received from a target at time $t_3$. Since all pulses are at the same frequency, the system is incapable of determining whether the return pulse is from the first or second transmitted pulse. Consequently, the system cannot determine the range of the target.

To circumvent the problems of feedline power losses, narrow bandwidths, and second-go-round returns, one prior art solution has been to incorporate individual phase shifters for each radiating element or use multi-bit phase shifters driving separate pluralities of elements, thus eliminating the serpentine feedline. The result is a phase scanned antenna as contrasted to the frequency scanned antenna above.

Typical of the phase scanned antenna is U.S. Pat. No. 4,045,800 for "Phase Steered Subarray Antenna" by R. Tang et al. This antenna incorporates a corporate feedline or power divider which operates to divide power equally at its outputs as well as providing equal length electrical paths therethrough. The corporate feedline feeds power to a plurality of 360° multi-bit phase shifters which in turn feed either one-bit or two-bit phase shifters which finally apply power to individual radiating elements.

Although power losses are reduced and bandwidth is much higher since no serpentine feedline is used, the overall complexity and cost of the system has increased. Considering the example hereinabove having 512 radiating elements, 512 phase shifters and associated drivers are necessary to make the antenna operational. In addition, it is necessary to further incorporate a computer to provide overall control of the phase shifters.

SUMMARY OF THE INVENTION

Thus it is an object of the present invention to provide an electronically scanned antenna which incorporates the benefits of both frequency and phase scanned antennas; namely, wide bandwidth, low power losses, nominal complexity and low cost.

It is a further object of the present invention to provide an electronically scanned antenna which is capable of radiating at multiple frequencies in a given direction and which is less susceptible to second-go-round return problems.

In accordance with these and other objects of the present invention, there is provided an electronically scanned antenna comprising a plurality of frequency scanned antenna sections, each section having a plurality of radiating elements, and being responsive to electromagnetic energy in a predetermined frequency band. Each section is adapted to provide at least one spatially steerable beam which is angularly steerable over a predetermined angular subtense in response to a frequency change over the predetermined frequency band.

The improvement comprises means, including a plurality of phase shifters individually coupled to the plurality of frequency scanned antenna sections, for adjusting the relative phase of the electro-magnetic energy processed by each of the frequency scanned antenna sections. The phase adjustment means causes the energy transmitted from the radiating elements, and the energy received through the radiating elements and processed through the plurality of phase shifters to have the same relative phase distribution as if provided by a continuous frequency scanned antenna.

In a first specific embodiment, the plurality of frequency scanned antenna sections substantially comprise serpentine feedlines disposed in a linear arrangement. In a second embodiment, the combination of the frequency scanned antenna sections forms substantially an interleaved antenna configuration. Each of the antenna sections have respective first radiating elements disposed adjacent to one another and separated by a first predetermined distance. The respective second radiating elements of each of the antenna sections are disposed adjacent to one another and separated by the first predetermined distance, and so on for all of the radiating elements of each of the antenna sections. The radiating elements of each antenna section are also separated from one another by a second predetermined distance.

Additionally, as part of the second embodiment, there is provided means for controlling the frequency of the transmitted energy and the frequency of the processed received energy and for controlling the phase settings of the plurality of phase shifters. The means for controlling causes the energy transmitted from the radiating elements and the energy received through the radiating elements and processed through the plurality of phase shifters to have the same relative phase distribution as if provided by continuous frequency scanned antenna.

In addition, the second embodiment comprising the antenna sections, phase shifters and the means for controlling the frequency and phase is also adapted to provide a plurality of frequency steered main beam lobes. The selection of a particular main lobe is determined by the predetermined selection of the phase shift pattern provided by the means for controlling such that the phase components of each individual beam lobe may be caused to add constructively or cancel destructively.

The particular phase shift pattern is determined by considering the plurality of frequency scanned antenna sections as a single continuous antenna section. At each particular frequency of the predetermined frequency band, a particular phase distribution exists in the antenna section. The phase at any point in the antenna section may be determined by measurement or calculation. Accordingly, the present invention breaks a single continuous antenna section into a plurality of subsections, and at each particular frequency applied to the plurality of subsections there is provided the requisite phase component to each of the plurality of subsections that would have occurred had the plurality of subsections been a single continuous antenna section. The means for controlling automatically provides the correct phase distribution to each of the plurality of phase shifters for each particular frequency in the predetermined frequency band, and as such the plurality of frequency scanned antenna sections performs like a single continuous frequency scanned antenna.

BRIEF DESCRIPTION OF THE DRAWING

The foregoing and other objects and features of the present invention may be more readily understood with reference to the following detailed description taken in conjunction with the accompanying drawing, wherein like reference numerals designate like structural elements, and in which.

DETAILED DESCRIPTION

Figure 1:
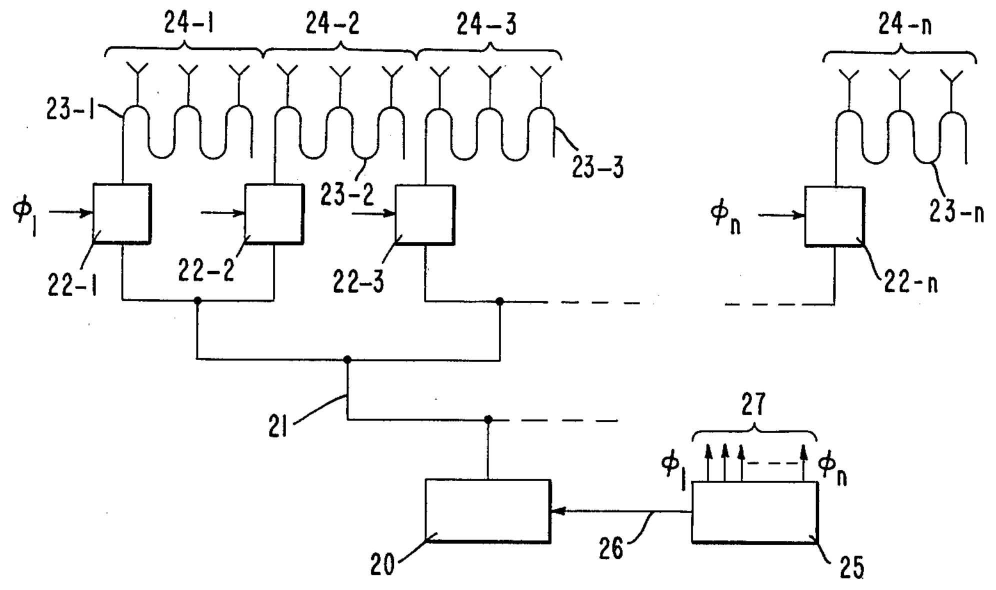
FIG. 1 illustrates a first embodiment of an antenna made in accordance with the principles of the present invention and incorporating serpentine feedlines.

Referring to FIG. 1, there is shown an electronically scanned antenna made in accordance with the principles of the present invention. A radar system 20, which may include a transmitter section, receiver section, and transmit/receiver switching section is coupled by way of a corporate feedline 21, or the like, to a plurality of phase shifters 22-1 to 22-n. The phase shifters 22-1 to 22-n are in turn coupled in an individual manner to a plurality of frequency scanned antenna sections 23-1 to 23-n, shown in FIG. 1 as serpentine feedlines, or the like. Each of the antenna sections 23-1 to 23-n have a plurality of radiating elements, designated by brackets 24-1 to 24-n. A control unit 25, such as a computer, or the like, is provided to control the programming of the phase shifters 22-1 to 22-n by means of phase control signals 27. In addition, the control unit 25 provides signals to control the frequency in the transmitter section of the radar system 20 by means of a frequency control signal 26.

The radar system 20 may be any suitable radar operating in X-band, C-band, K-band, or the like, depending upon the particular application required by the system 20. The corporate feedline 21 is adapted to provide predetermined amounts of power at the input section of each of the antenna sections 23-1 to 23-n when the radar system 20 is operating in the transmit mode. In the receive mode, the corporate feedline 21 acts as a conduit and transmits power from the antenna sections 23-1 to 23-n to the receiver section of the radar system 20.

Each of the phase shifters 22-1 to 22-n is adapted to control the phase of the power applied to each respective antenna section 24-1 to 24-n. The phase shifters 22-1 to 22-n are controlled by the control unit 25, by means of the phase control signals 27, which program each phase shifter 22-1 to 22-n for the appropriate amount of phase shift or time delay depending upon the frequency of the power being radiated, while the system 20 is in the transmit mode. The control unit 25, by means of the frequency control signal 26, also simultaneously controls the frequency of the energy provided from the transmitter section of the system 20. The signal 26 also functions to control the frequency of the signals processed by the receiver section during the receive mode of the radar system 20. Also, the initial phase shifter 22-1 may not be necessary in all applications. For totally coherent operation, however, such as is required in a moving vehicle application, the initial phase shifter 22-1 may be desirable to provide a coherent phase front.

Frequency scanning, as generally applied to electronically scanned antennas, is well-known in the art. Upon application of electromagnetic energy in a predetermined frequency band to any particular frequency scanned antenna section 23-1, and subsequent frequency scanning thereof, provides a steerable energy beam. As described in the background herein, the spatial steering is a function of frequency of the energy, and the physical separation of the radiating elements 24-1 and the length of the feedline between adjacent radiating elements 24-1.

The present invention incorporates the plurality of the antenna sections 23-1 to 23-n along with the plurality of phase shifters 22-1 to 22-n to provide for the frequency scanning described above, along with the phase correction associated with the phase shifters 22-1 to 22-n. Incorporation of individual phase shifters 22-1 to 22-n for each respective antenna section 23-1 to 23-n provides the antenna with a wider bandwidth and lower power losses than a conventional frequency scanned antenna having the same overall length. Additionally, the cost and relative complexity of this arrangement is less than a phase scanned of equivalent size.

The background described a typical 10 GHz frequency scanned antenna having a length of 10 meters. That antenna had a theoretical bandwidth of 70 KHz, while showing a power loss of 14 dB theoretical and 28 dB in actual practice over the length of the antenna. However, by using the principles of the present invention, such as dividing the conventional antenna into 16 antenna sections, and providing a center-fed arrangement, for example, allows for dramatic improvements.

The power loss at the last radiating element of antenna section 23-n (in this case, 23-16) is due to the loss in the phase shifter 22-16 plus the loss in the straight feedline between the phase shifter 22-16 and the antenna section 23-16, plus the loss in the antenna section 23-16. The phase shifter loss is about 2.0 dB, the straight guide loss is 0.6 dB (4.5 meters at 0.13 dB/meter), and the antenna section loss is 1.1 dB (8.7 meters at 0.13 dB/meter). This results in a total power loss at the last radiating element in the antenna section 23-16 of only 3.7 dB as compared to the 30 dB in the pure frequency scanned antenna described above.

In addition, the antenna with 16 sections has a theoretical bandwidth of 11.2 MHz and a practical bandwidth of 1.12 MHz, yielding a range resolution of 90 meters. Also, use of the phase shifters 22-1 to 22-n associated with each antenna section 23-1 to 23-n allows for correction for curvature of the overall antenna array if it should be required.

A further advantage of the present invention is its ability to accept or reject second-go-round returns from distant targets. As mentioned previously, second-go-round returns occur in a radar system when the system transmits a first pulse of energy at one frequency at time $t_1$, and a second pulse of the same frequency at time $t_2$, and then a return pulse from the first transmitted pulse is received from the target.

Whereas the conventional fequency scanned antenna cannot distinguish or reject second and other higher order go-round returns, the present invention, by proper scan sequencing, can accept or reject second-go-round returns. This is possible since the present invention can form a beam in transmit mode or accept a beam in receive mode which at any given position is comprised of energy of different frequencies. For example, using the first embodiment described above, each of the antenna sections has a feedline which is 8.7 meters long. At X-band, a frequency change of about 50 MHz results in a $2\pi$ phase change over 8.7 meters of feedline. Thus, if the phase shifters 22-1 to 22-n are set to a phase pattern required for operation at frequency $f_o$, the same phase pattern provides operation at frequencies $f_o\pm50$ MHz, $f_o\pm100$ MHz, and so on. Accordingly, the the antenna will simultaneously receive $f_o$, $f_o\pm50$ MHz, $f_o\pm100$ MHz, etc., and reject all other frequencies. Thus, in order to receive higher-order go-rounds, the antenna must use a fixed phase shift pattern and transmit successive frequencies 50 MHz apart. If rejection of such higher-order go-rounds is desired, the 50 MHz steps must be avoided.

Another way of looking at the first embodiment is as follows. The frequency scanning characteristics of each antenna section 24-1 to 24-n is determined by the frequency of the energy, the physical distance between radiating elements of the sections 24-1 to 24-n and the length of the feedline between the elements. There is a predetermined phase shift due to the length of the feedline between radiating elements.

In a conventional frequency scanned antenna the feedline is continuous, thus interconnecting all radiating elements in the array. The present invention, however, breaks the continuous feedline into a plurality of smaller feedlines and adjusts the phase of the energy at the beginning of each of the smaller feedlines by means of phase shifters to provide each radiating element in the plurality of subarrays with energy of the same phase as would have occurred if the feedline were continuous. It is to be understood that both frequency and phase scanning is performed in one dimension.

Figure 2:
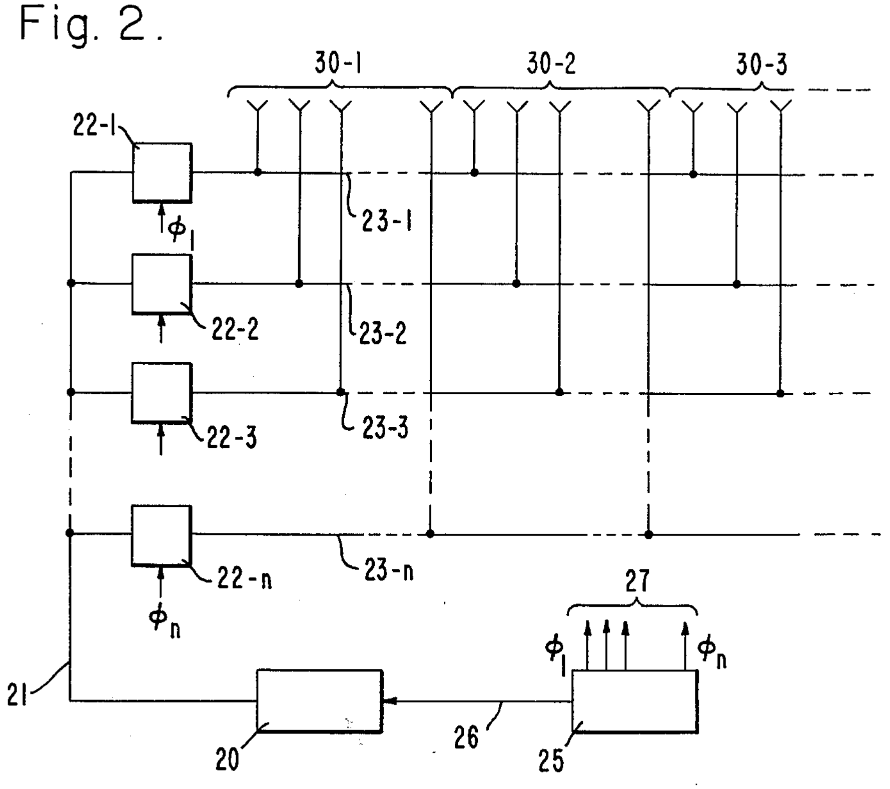
FIG. 2 illustrates a second embodiment of an antenna made in accordance with the present invention incorporating an interleaved thinned antenna array.

FIG. 2 illustrates a second embodiment of an antenna made in accordance with the present invention. A radar system 20, which may operate at X-band, C-band, K-band, or the like, is coupled by means of a power divider or corporate feedline 21 to a plurality of phase shifters 22-1 to 22-n. The plurality of phase shifters 22-1 to 22-n are coupled to individual feedlines of a plurality of feedlines 23-1 to 23-n. The feedlines 23-1 to 23-n are in turn coupled to a plurality of radiating elements 30-1 to 30-n.

The radiating elements 30-1 to 30-n arranged differently than in the first embodiment above. This configuration is in the form of an interleaved thinned array antenna. As such, the first radiating element of the first feedline 23-1 is adjacent to the first radiating element of the second feedline 23-1 and separated by a first predetermined distance such as in the first embodiment. The remaining first radiating elements of each of the remaining feedlines are disposed in a similar adjacent manner. In like manner, the second radiating elements of the plurality of feedlines 23-1 to 23-n are disposed adjacent to one another and separated by the same first predetermined distance. The same relationship exists for all remaining radiating elements of their respective feedlines. The radiating elements of each feedline 23-1 to 23-n are also separated from one another by a second predetermined distance. A control unit 25 provides phase control signals 27 to each of the phase shifters 22-1 to 22-n and also frequency control signal 26 to the radar system 20 as in the first embodiment.

Whereas in the first embodiment the phase between adjacent radiating elements is controlled by the length of the feedline between the adjacent elements, in the second embodiment the phase is controlled by means of the phase shifters 22-1 to 22-n. Appropriate control of both the frequency and the phase shifter settings provide a focused, steerable beam.

The power losses are even less than in the first embodiment, since no serpentine feedlines are used. Accordingly, in the 10 meter antenna example, each feedline 23-1 to 23-n has an 0.7 dB loss (5.33 meters at 0.13 dB/meter) plus a 2.0 dB loss in each of the phase shifters 22-1 to 22-n, resulting in a total loss in each feedline of 2.7 dB as compared with the 30 dB loss in the conventional frequency scanned antenna.

Additional advantages are available in this configuration. If the frequency shift of the particular antenna is sufficiently large, a plurality of frequencies may be pointed in each pointing direction. For example, a 10 meter X-band thinned array antenna, operating at 10 GHz and incorporating 32 phase shifters feeding 32 rows of 16 elements spaced 0.65λ apart, has a thinned array spacing of 62 centimeters between adjacent elements of each feedline 23-1 to 23-n. A frequency shift of about 500 MHz results in a 2π phase shift. Accordingly, frequencies 500 MHz apart may be pointed in the same direction by appropriate phase shifts. With a 20% scanning frequency band, as in the continuing example, four different frequencies are available at each pointing direction. Conversely, a plurality of pointing directions are available at each frequency.

Figure 3:
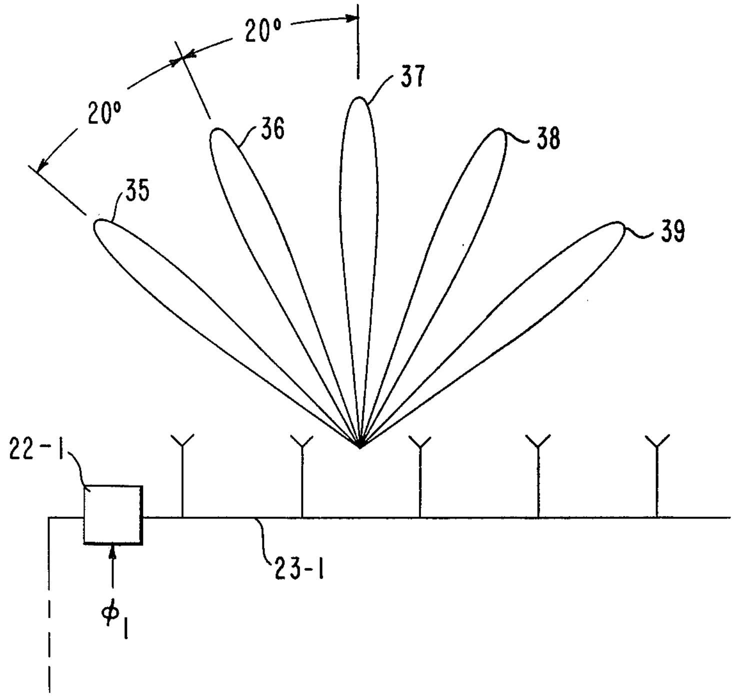
FIG. 3 illustrates the multi-beam capability of a single feedline of the antenna of FIG. 2.

An additional advantage of the second embodiment of the present invention may be understood by referring to FIG. 3 in conjunction with FIG. 2. FIG. 3 shows a single thinned array section of the antenna of FIG. 2 including the phase shifter 22-1, feedline 23-1 and a plurality of radiating elements of that feedline 23-1.

A beam pattern including five main lobes 35–39, for example, may be radiated by this configuration. Each of the remaining thinned array sections of the antenna of FIG. 2 also has an identical beam patterns associated therewith. By proper choice of phase shift patterns in the phase shifters 22-1 to 22-n, cancellation of unwanted lobes, say 35, 36, 38, 39 may be accomplished. Accordingly, one main lobe 37 is utilized in most applications.

However, this antenna configuration allows the possibility of scanning over a limited frequency band while using each of the main lobes 35–39 over a limited angular subtense to provide a full angular scan. For instance, by proper choice of phase shift pattern, lobe 35 may be used and lobes 36–39 cancelled. By appropriate frequency scan, a 20° spatial beam motion may be achieved, for example. The phase shift pattern may then be changed to utilize the second beam lobe 36, and the frequency scan repeated over the same band resulting in a scan of the second 20° interval with the second lobe 36, and so on. If the full frequency scan is used, thus not being limited to 20°, the antenna may be programmed to respond to multiple frequencies in any given pointing direction as described hereinabove.

Thus, there has been described an electronically scanned antenna which incorporates both frequency scanning and phase scanning in one dimension and provides for low power losses, wide bandwidth, and relatively low cost as compared with conventional frequency scanned or phased array antennas of comparable size. Various embodiments of the antenna allow for correction due to curvature of the array, controlled reception or rejection of higher-order go-rounds, multiple frequency pointing in a given direction and multiple pointing and tracking directions at each frequency.

It is to be understood that the above-described embodiments are merely illustrative of but a small number of specific embodiments which represent applications of the principles of the present invention. Clearly, numerous and varied other arrangements can be readily devised in accordance with these principles by those skilled in the art without departing from the spirit and scope of the invention.

What is claimed is:

1. An electronically scanned antenna comprising a plurality of frequency scanned antenna sections, each of said sections having a plurality of radiating elements, said sections being responsive to electromagnetic energy in a predetermined frequency band, each of said sections being adapted to provide at least one spatially steerable beam which is angularly steerable over a predetermined angular subtense in response to a frequency change over said predetermined frequency band, wherein the improvement comprises:

said frequency scanned antenna sections being colinear; and said antenna further comprising means, including a plurality of phase shifters individually coupled to said plurality of frequency scanned antenna sections, for adjusting the relative phase of the electromagnetic energy processed by each of said plurality of frequency scanned antenna sections, so as to cause the energy transmitted from said radiating elements and the energy received through said radiating elements and processed through said plurality of phase shifters to have the same relative phase distribution as if provided by a continuous linear frequency scanned antenna.

2. The antenna of claim 1 wherein said frequency scanned antenna sections substantially comprise serpentine feedlines disposed in a linear arrangement.

3. The antenna of claim 1 wherein the combination of said frequency scanned antenna sections form substantially an interleaved antenna configuration, each of said antenna sections having respective first radiating elements disposed adjacent one another and separated by a first predetermined distance, and having respective second radiating elements disposed adjacent to one another and separated by said first predetermined distance, and so on for all said radiating elements of said antenna sections, said radiating elements of each of said antenna sections being separated from one another by a second predetermined distance.

4. An electronically scanned antenna comprising a plurality of frequency scanned antenna sections, each of said sections having a plurality of radiating elements, said sections being responsive to electromagnetic energy in a predetermined frequency band, each of said sections being adapted to provide at least one spatially steerable beam which is angularly steerable over a predetermined angular subtense in response to a frequency change over said predetermined frequency band, wherein the improvement comprises:

said frequency scanned antenna sections being colinear;

said antenna further comprising means including a plurality of phase shifters individually coupled to said plurality of frequency scanned antenna sections; and means for controlling the frequency of the transmitted energy and the frequency of the processed received energy and for controlling the phase settings of said plurality of phase shifters so as to cause energy transmitted from said radiating elements and the energy received through said radiating elements and processed through said plurality of phase shifters to have the same relative phase distribution as if provided by a continuous linear frequency scanned antenna.

5. The antenna of claim 4 wherein the combination of said frequency scanned antenna sections form substantially an interleaved thin antenna configuration, each of said antenna sections having respective first radiating elements disposed adjacent to one another and separated by a first predetermined distance, and having respective second radiating elements disposed adjacent to one another and separated by said first predetermined distance, and so on for all said radiating elements of said antenna sections, said radiating elements of each of said antenna sections being separated from one another by a second predetermined distance.

6. The antenna of claims 4 or 5 wherein said antenna sections, in conjunction with said phase shifters and means for controlling, are adapted to provide a plurality of main beam lobes, said plurality of main beam lobes being frequency steerable, the selection of a particular main beam lobe which constitutes the energy transmitted from said radiating elements and the energy received from said radiating elements and processed through said plurality of phase shifters being determined by the predetermined selection of the phase shift pattern provided by said means for controlling.

* * * * *